United States Patent [19]

Davidovich et al.

[11] Patent Number: 4,489,581
[45] Date of Patent: Dec. 25, 1984

[54] METHOD OF MANUFACTURING ARTICLES BY DEFORMATION OF CYLINDRICAL BLANKS

[75] Inventors: Alexandr N. Davidovich; Valery Y. Schukin; Valery A. Klushin; Vladimir I. Sadko, all of Minsk; Nikolai M. Skrebets; Evgeny T. Murashko, both of Lida, all of U.S.S.R.

[73] Assignee: Fiziko-Tekhnichesky Institut Akademi Nauk Belorusskoi SSR, U.S.S.R.

[21] Appl. No.: 459,610
[22] PCT Filed: May 26, 1981
[86] PCT No.: PCT/SU81/00045
 § 371 Date: Jan. 7, 1983
 § 102(e) Date: Jan. 7, 1983
[87] PCT Pub. No.: WO82/04207
 PCT Pub. Date: Dec. 9, 1982
[51] Int. Cl.³ .............................................. B21H 1/00
[52] U.S. Cl. ......................................... 72/70; 72/108
[58] Field of Search ...................... 72/70, 71, 92, 108, 72/88, 90, 94

[56] References Cited

FOREIGN PATENT DOCUMENTS 74762 7/1970 German Democratic Rep. .
303135 8/1971 U.S.S.R. .
418260 7/1974 U.S.S.R. .
479551 11/1975 U.S.S.R. .
694262 10/1979 U.S.S.R. .

OTHER PUBLICATIONS

"Cross Wedge Rolling", 1974, E. M. Makushok, pp. 134–146 with translation.

Primary Examiner—Lowell A. Larson
Attorney, Agent, or Firm—Steinberg & Raskin

[57] ABSTRACT

Disclosed is a method of manufacturing articles by deformation of cylindrical blanks, comprising heating the blanks (1), their transverse wedge forming followed by deformation of the end crops (3) by shearing blades, separating the end crops (3) from the formed blanks (2), and flashless forging of the formed blanks (2), separation of the end crops (3) from the formed blanks (2) being performed by reducing the speed of rotation of the end crops (3) after deformation down to a value ranging from $\omega/2.5$ to zero, where $\omega$ is the speed of rotation of the blank (2) during forming.

2 Claims, 5 Drawing Figures ical blanks.

METHOD OF MANUFACTURING ARTICLES BY DEFORMATION OF CYLINDRICAL BLANKS

FIELD OF THE INVENTION

The present invention relates to metal working and, more particularly, to methods of manufacturing articles by deformation of cyclindrical blanks.

DESCRIPTION OF THE PRIOR ART

Known in the art is a method of manufacturing articles by deformation of cylindrical blanks (cf. a book "Poperechno-clinovaya prokatka" edited by E. M. Makushka, published by "Nauka i Tekhnika" Publishing House, Minsk, 1974, pp. 134–146), wherein cylindrical blanks chopped from the bar are heated and subjected to transverse wedge forming followed by deformation of end crops and their further separation from the formed articles.

This method makes it possible to manufacture only such articles which have the shape of the bodies of revolution and fails to be used for manufacturing the articles of other than mentioned above shape, for example, prismatic shape.

Also known in the art is a method of manufacturing articles by deformation of cylindrical blanks described in the GDR Pat. No. 74,762 published in 1970, and serving as a prototype of the present invention. This method comprises heating the blanks, their transverse wedge forming and flashless forging of the formed blanks, i.e. it allows making of articles of essentially any shape. End crops formed at the terminal parts of the blanks as a result of transverse wedge forming are deformed by shearing blades mounted on the forming machine, and since the shearing blades are mounted with a technological clearance to prevent their overlapping and damage when the operating height between the oppositely disposed forming tools is changed, necks are formed in the process of deformation of the end crops between said end crops and formed blanks, the thickness of the necks corresponding to said technological clearance between the shearing blades. In order to separate the end crops from the blanks it is necessary to break these necks down.

When the technological clearances are very small, e.g. of about 0.1 mm, and the operating edges of the shearing blades have not yet become blunt and are still sharp, these necks can probably be ruptured in the process of deformation of the end crops. However, when the technological clearances are comparatively large, e.g. of about 0.2 to 3 mm, and the operating edges of the shearing blades become blunt, strong necks are formed between the blanks and the end crops and a separate procedure performed outside the forming equipment, e.g. in ball mills, is required to break down said necks, repeat heating of the blanks being necessary for flashless forging following the separation procedure. All this considerably increases the expenditure and results in loss of production rate when manufacturing the articles.

SUMMARY OF THE INVENTION

The principal object of the present invention is to provide a method of manufacturing articles by deformation of cylindrical blanks which provides reliable separation of end crops from the formed blanks immediately after transverse wedge forming and does not require repeat heating of the blanks prior to flashless forging.

With this principal object in view, there is provided a method of manufacturing articles by deformation of cylindrical blanks, comprising the steps of heating the blanks, their transverse wedge forming followed by deformation of end crops by shearing blades, separating the end crops from the formed blanks and flashless forging of the formed blanks, wherein, according to the invention, the step of separatings of the end crops from the formed blanks is performed by reducing the speed of rotation of the end crops after deformation down to a value ranging from $\omega/2.5$ to zero, where $\omega$ is the speed of rotation of the blank during forming.

Due to reduction in the speed of rotation of the end crops, the necks formed between the end crops and the formed blanks are subjected to torque which causes shear deformations therein, the value of said shear deformations at the aforementioned relation of the speeds of rotation of the blanks and the end crops being enough to rupture the necks having the thickness corresponding to the values of technological clearance between the shearing blades adopted in practice. If the speed of rotation of the end crops is reduced by less than 2.5 times relative to the speed of rotation of the blanks during the forming process, shear deformations in the necks would not be sufficiently intensive and would not provide one hundred percent probability of separation of the end crops.

Thus separation of the end crops from the formed blanks according to the proposed method can be made on the forming equipment provided in addition with simple attachments for braking the end crops. This allows avoiding of heating of the blanks prior to flashless forging and hence to decrease the time required for manufacturing the articles as well as to increase the production rate.

The present invention will subsequently be more apparent from the detailed description of its preferred embodiment taken in conjunction with the accompanying drawings.

BEST MODE TO CARRY OUT THE INVENTION

Figure 1A:
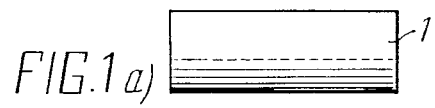
FIGS. 1a–f illustrate the sequence of operations in a method of manufacturing the articles by deformation of cylindrical blanks, according to the invention.
Figure 1B:
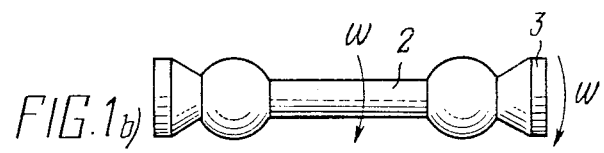

As best shown in FIG. 1a, the initial cylindrical blanks 1 are heated, for example, in an induction heater up to a forging temperature and are fed one by one to the transverse wedge forming machine wherein the blank 1 is bitten by a forming tool and rotated with an angle speed $\omega$. In the course of displacement of the blank 1 lengthwise with respect to the tool, it is formed into a desired shape which is accompanied by decrease in the diameter of the blank 1 at the appropriate places as well as by elongation thereof. A formed blank 2 is shown in FIG. 1b. When forming, the excess of metal, also referred to as end crops, accumulates at the ends of the blank 2 and is to be further separated therefrom.

Figure 1C:
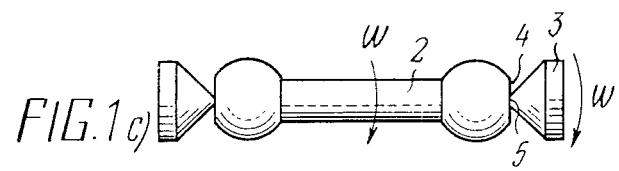

On completion of the process of forming the blank 2, the end crops 3 rotating with the same speed ω are deformed by shearing blades, whereby shear planes 4 on the blank 2 and necks 5 between the latter and the end crops 3 are formed as best shown in FIG. 1c. Deformation of the end crops 3 is performed until the operating height between the shearing blades is reduced to the value of technological clearance between them.

Figure 1D:
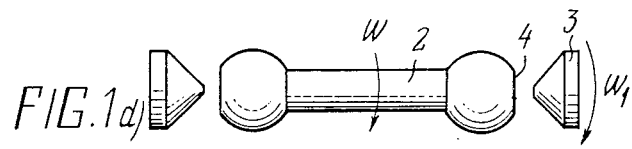

Then the speed of rotation of the end crops 3 is reduced, e.g. with the help of prismatic braking elements mounted on their own ways, down to a value ω chosen in the range of from ω/2.5 to zero depending on the material of the blank 2, the value of the technological clearance between the shearing blades, and the temperature of heating of the blank 2. Reduction in the speed of rotation of the end crops 3 relative to the speed of rotation of the blank 2 in the range mentioned above brings to shear deformations occurring in the necks 5 which rupture the necks as it is shown in FIG. 1d, the intensity of shear deformation being dependent upon the correlation of said speeds. In case the value of the technological clearance between the shearing blades is comparatively large and the necks 5 (FIG. 1c) are found to be comparatively thick, for example, in the range from 0.2 to 3 mm, shear deformations of higher intensity are required to break them down which can be attained through reducing the speed of rotation of the end crops almost to zero, i.e. to complete braking. If the thickness of the necks 5 is comparatively small, does not exceed 0.2 mm, shear deformation of less intensity is required to break them down, i.e. it would be sufficient to reduce the speed of rotation of the end crops 3 relative to the speed of rotation of the blanks 2 only by 2.5 times. As the industrial tests have shown when the relation of the speed of rotation of the blank 2 to that of the end crops 3 is less than 2.5, one hundred percent probability of rupture of the necks 5 is not provided.

Figure 1E:
Figure 1F:
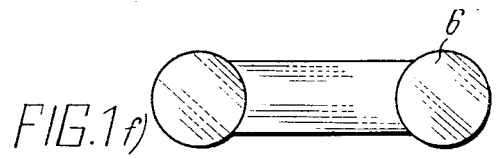

Upon separation of the end crops 3 from the formed blank 2, the latter is subjected to flashless forging and a finished article 6 is produced, two projections thereof being shown in FIGS. 1e and 1f.

Figure 2:
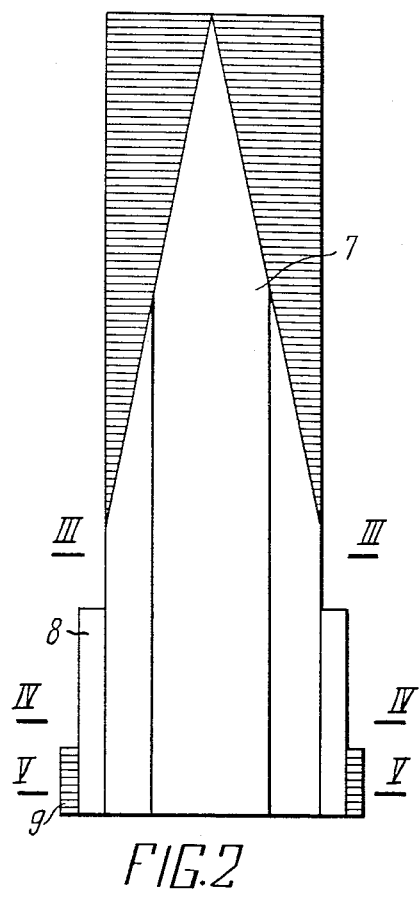
FIG. 2 shows an embodiment of the apparatus for realizing the operations of transverse wedge forming, deformation of the end crops and separation thereof from the blanks, according to the invention.

FIG. 2 shows the apparatus allowing to realize the operations of transverse wedge forming, deformation of the end crops and separation thereof from the blank according to the method described above. The apparatus comprises a pair of oppositely disposed wedge-shaped tools 7 (FIG. 2 presents only one tool 7), shearing blades 8 mounted on both sides from the tool 7 at their terminal parts, and prismatic elements 9 arranged adjacent to the shearing blades 8 and having technological cuts on the surface facing the blank.

Figure 3:
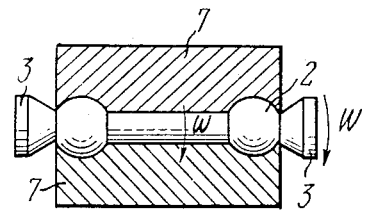
FIG. 3 is a sectional view taken along the line III—III of FIG. 2.
Figure 4:
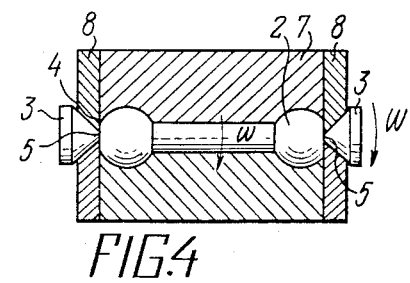
FIG. 4 is a sectional view taken along the line IV—IV of FIG. 2.
Figure 5:
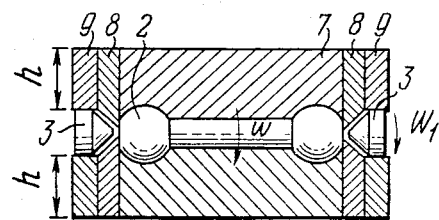
FIG. 5 is a sectional view taken along the line V—V of FIG. 2.

The movement of the blank between a pair of oppositely disposed wedge-shaped tools 7 is illustrated in FIGS. 3, 4 and 5. When the blank 2 is moved along the initial zone of the tool 7, corresponding to the upper part of the FIG. 2, transverse wedge forming of the blank 2 is performed followed by formation of the end crops 3, as shown in FIG. 3, the speed ω of rotation of the blank 2 and of the end crops 3 being equal. When the forming of the blank 2 is completed, the blank 2 is displaced by further moving tool 7 to the shearing blades 8 performing deformation of the end crops 3, as a result of which narrow necks 5 (FIG. 4) are formed between said crops and the blank 2, the speed of rotation of the end crops 3 remaining practically unchanged.

Then the formed blank 2 is further moved along the tool 7 with the same speed ω and the end crops 3 mesh with the prismatic elements 9 (FIG. 5) whereby the speed of rotation is reduced to the value ω/2.5. Due to the difference in the speeds of rotation of the blank 2 and the end crops 3, the necks 5 (FIG. 4) between them are ruptured under the action of shear deformations and the end crops 3 are separated from the blank 2 as shown in FIG. 5. The speed of rotation of the end crops 3 required to rupture the necks when said crops are meshed with the prismatic elements 9 is defined by the height "h" of the prismatic elements 9.

The proposed method was checked in producing the articles of the type of conveyer chain links. Cylindrical blanks of 18 mm diameter and 43 mm length from carbon steel were heated up to the temperature of from 1100° to 1200° C. and fed to the transverse wedge forming machine wherein the technological clearance between the shearing blades was adjusted in three different values. As a result, three lots of formed blanks were produced after deformation of end crops, the diameter of necks between the blanks and the end crops being different, namely the diameters were 3 mm, 1 mm and 0.5 mm. Each lot amounted to 1000 blanks.

The end crops were separated from the blanks through braking them by the braking prismatic elements. In the first lot having the necks of 3 mm in diameter the end crops were separated from all the blanks when the speed of rotation of the end crops was reduced by 8 times. In the second lot having the necks of 1 mm in diameter the end crops were separated at the reduction of the speed of rotation of the end crops by 5 times. In the third lot having the necks of 0.5 mm in diameter the end crops were separated when the speed of rotation of the end crops was reduced by 3 times.

COMMERCIAL APPLICABILITY

The invention can be applied to advantage in industry for large scale and mass production of different articles of complicated geometrical shape, for example, the conveyor chain links, which at present are manufactured by cutting and forging with flashes. Application of the proposed method provides decrease in expenditure and increase in production rate.

We claim:

1. In a method for the manufacture of an article by deformation of a substantially cylindrical blank, comprising heating the blank, forming the blank and at least one end crop thereof, deforming the at least one end crop by application of at least one shearing blade thereto, separating the deformed end crop from the formed blank, and flashlessly forging the formed blank, the improvement comprising separating the end crop from the formed blank by reducing speed of rotation of the end crop after deformation thereof, to a value in the range of between about 1/2.5 to 0 times the rotational speed of the formed blank.

2. In the combination of claim 1, wherein the blank and two crops are formed by rotating the blank between a pair of wedge-shaped elements, and the two crops are deformed by applying a pair of shearing blades to each rotating crop to narrow a neck thereof connecting each crop to the blank, the improvement comprising reducing the speed of rotation of each crop by meshing each crop with a pair of prismatic breaking elements.

* * * * *